Feb. 1, 1944.  E. W. DAVIS  2,340,455

LUBRICATING APPARATUS

Original Filed Jan. 11, 1937   2 Sheets-Sheet 1

Inventor
Ernest W. Davis
By Williams, Bradbury & Hinkle
Attys.

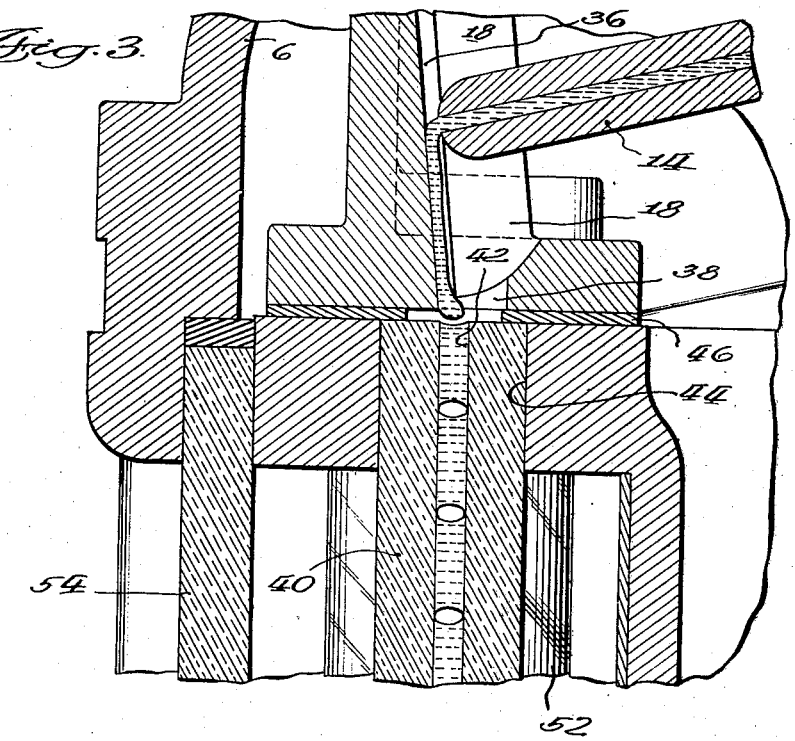
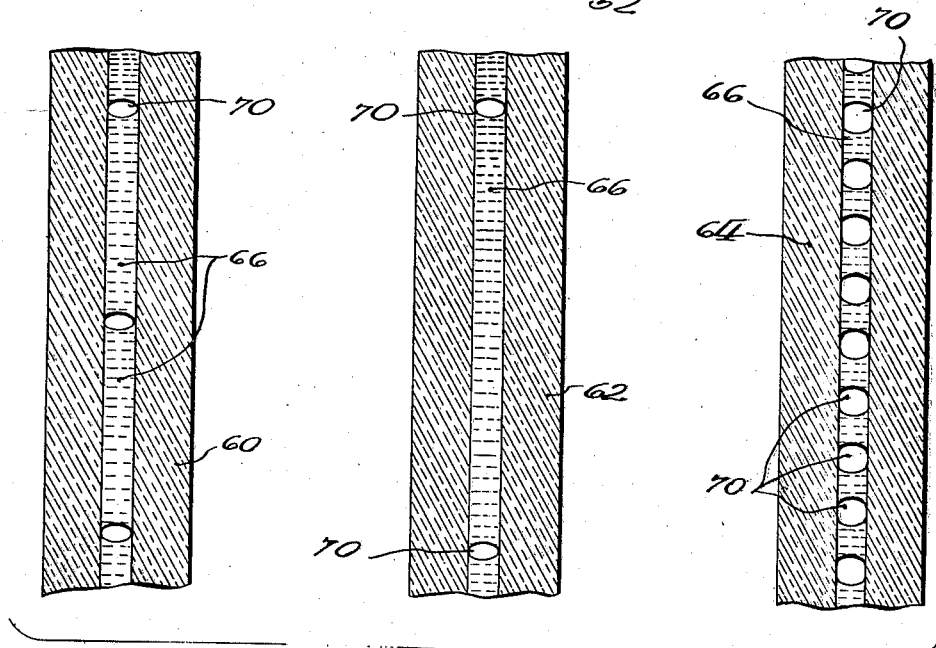

Patented Feb. 1, 1944

2,340,455

UNITED STATES PATENT OFFICE 2,340,455

LUBRICATING APPARATUS

Ernest W. Davis, River Forest, Ill., assignor to Stewart-Warner Corporation, Chicago, Ill., a corporation of Virginia Original application January 11, 1937, Serial No. 119,913. Divided and this application June 9, 1941, Serial No. 397,207

6 Claims. (Cl. 184—96)

This application is a division of my prior co-pending application, Serial No. 119,913, filed January 11, 1937, now Patent Number 2,274,473, issued February 24, 1942.

My invention relates generally to indicators, and more particularly to indicators suited for use in indicating the rate of flow of lubricant from a centralized lubricating system, although my indicator may be used in connection with any liquid.

It has been standard practice to use what are commonly known as sight feed oilers to indicate the rate of lubricant flow in stationary oiling systems. In devices of this type the flow of lubricant is controlled by a needle valve and the lubricant flows from the oiler drop by drop. A transparent window is provided so that the operator may observe the speed of formation of these drops and thereby estimate the rate of flow of lubricant. In the ordinary operation of these sight feed lubricating devices, they are usually adjusted for low rates of flow and the drops of lubricant form slowly. At these low rates of flow it is time-consuming to arrive at the proper adjustment of the needle valve, inasmuch as the operator must wait until several drops of lubricant have passed to the machine before he is at all certain of the accuracy of his needle valve adjustment. Also, a sight feed oiler affords no means by which the operator of a machine can tell at a glance whether or not lubricant is flowing to the machine. If the lubricating device becomes clogged and ceases to supply lubricant while the machine is in operation, it may be some time before this fact is discovered and injury to the frictional surfaces of the machine may result.

It is therefore an object of my invention to provide an improved indicator for a stationary oiling system which allows the rate of flow of lubricant to be quickly and accurately estimated by the operator of the machine being lubricated.

Another object is to provide a rate of flow indicator, suited for use in connection with central lubricating systems, by means of which the operator of a machine being lubricated may tell at a glance whether or not lubricant is being supplied to the machine.

A further object is to provide a lubricant flow indicator, suited for use in connection with a central lubricating system for supplying lubricant to a plurality of frictional surfaces, individually, which affords the operator of a machine a quick, simple, and reliable indication of the relative amounts of lubricant being supplied to the various frictional surfaces thereof.

Other objects will appear from the following description, reference being had to the accompanying drawings in which.

Figures 1, 2:
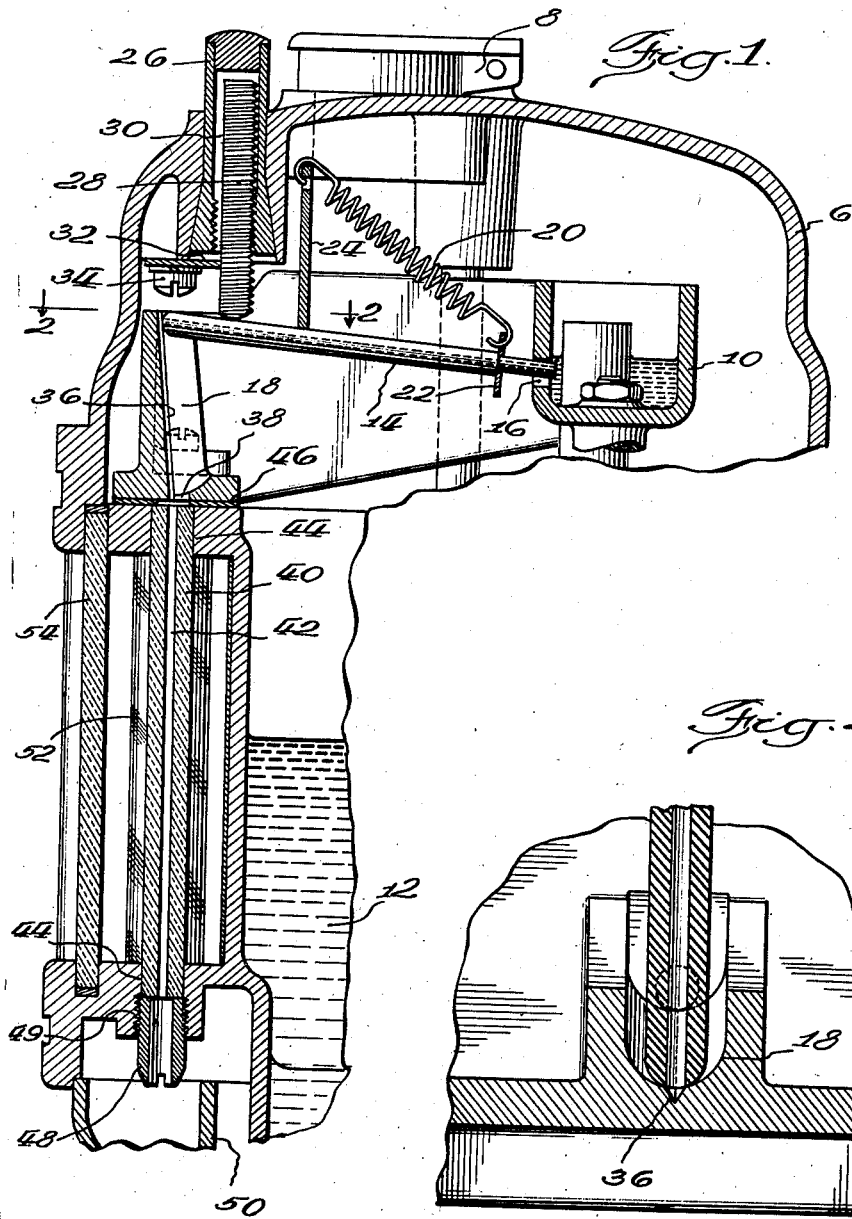
Fig. 1 is a fragmentary cross-sectional view of a centrally located lubricating device, showing in cross section my improved rate of flow indicator.
Fig. 2 is an enlarged fragmentary cross-sectional view along the line 2—2 of Fig. 1, showing a detail of the construction of a rate of flow regulating device suited for use in connection with the indicator of my invention.

Fig. 3 is an enlarged vertical cross-sectional detail view through a portion of my improved rate of flow indicator; and Fig. 4 is an enlarged vertical cross-sectional view through a portion of the tubes forming part of my indicator, illustrating the appearance of the tubes when used in connection with a central lubricating system lubricating a plurality of frictional surfaces and so adjusted that lubricant flows to different frictional surfaces at different rates.

Referring to Fig. 1, the lubricating device incorporating my improved indicator is enclosed by a suitable casing casting 6 which is provided with a convenient filler cap 8. A trough-shaped lubricant reservoir 10 is kept filled to a constant level with lubricant from a main lubricant supply 12, as is described in my said prior co-pending application. Lubricant is conducted from the auxiliary reservoir 10 by a capillary tube 14 of suitable dimensions. The inlet end of this tube 14 is of reduced outside diameter and projects through a suitable opening 16 formed in the auxiliary reservoir 10 below the normal oil level therein. The opening 16 is shown as being of appreciably larger diameter than the outside of the inlet end of the tube 14 but, due to the viscosity and surface tension of the oil, there will be no appreciable leakage of lubricant through this opening. The outlet end of the tube 14 is rounded and is held in a rounded groove 18, formed in the casing casting 6, by a suitable coil spring 20 which is secured under tension between a washer 22, which fits over the reduced inlet end portion of the tube 14, and a plate 24 attached to the casting 6.

The slope of the capillary tube 14 may be adjusted by the rotation of a nut 26 secured in the casting 6 and threaded upon a stud 28 having a flattened side 30. The nut 26 is secured against longitudinal movement and is free to rotate, while the stud 28 is prevented from rotating by the engagement of the flattened side 30 with the edge of a plate 32 which is secured to the casting 6 by suitable screws 34. The lower end of the stud 28 engages the capillary tube 14 near its outlet end. Thus, upon rotation of the nut 26, the outlet end of the capillary tube 14 may be caused to move upwardly or downwardly in the groove 18, thereby varying the gradient of the tube 14 and the resultant rate of flow therethrough.

As is shown in Fig. 2, the rounded outlet end of the capillary tube 14 has its bore in registry with a triangular capillary groove 36 formed at the base of the rounded groove 18. The triangular capillary groove 36 terminates in a suitable open pocket or receptacle 38, shown in Figs. 1 and 3, for receiving and collecting small quantities of lubricant. It is contemplated that a plurality of the foregoing flow control devices may be used in connection with a single lubricating device, as is shown and described in my said co-pending application.

The structure thus far described is claimed in my said prior co-pending application, and is not claimed herein except as it may be claimed generically in connection with the rate of flow indicator now to be described.

Beneath the lubricant receiving receptacle 38 is a transparent tubing 40, of glass or the like, having a relatively small internal bore 42 of capillary dimensions, large enough in diameter to have a lubricant transmitting capacity slightly in excess of the maximum rate of flow of lubricant for which the device is designed, and small enough in diameter to prevent lubricant and air from entering the tube simultaneously. The ends of the capillary tube are received in a suitable hole 44 formed in the casing casting 6. The inlet end of the tube 40 is held firmly against a suitable gasket 46 by a hollow externally threaded nipple 48 threaded into a correspondingly threaded hole 49 in the casting 6.

The inlet end 50 of a lubricant conducting conduit is placed immediately below the nipple 48 to receive the lubricant and conduct it to a frictional surface of the machine being lubricated. If desired, a suitable gauge glass 52 may be provided to indicate the upper level of the main oil supply 12. It is contemplated that a plurality of indicator tubes 40 may be used in connection with a single central lubricating device, that these tubes each have a lubricant flow control associated with them, and that they be placed adjacent each other so that the rates of flow through the various tubes may be quickly and accurately compared. The indicator tubes and the gauge glass 52 are protected from dust and breakage by a suitable plate glass window 54.

In operation, lubricant in the auxiliary reservoir 10 is brought up to its proper level. Lubricant then flows by capillary action through the capillary tube 14, and wets the triangular groove 36, so that capillary action maintains the flow of lubricant through the tube 14. Lubricant flows downwardly in the triangular groove 36 under the influence of capillary action and gravity and accumulates in the receptacle 38. From the receptacle 38, the lubricant flows into the bore 42 of the associated transparent tubing 40.

As the size of the bore 42 is proportioned so that the rate of lubricant flow therethrough is slightly greater than the maximum rate of lubricant flow into the receptacle 38, the stream of oil flowing through the tube 40 will not be continuous, but will be in the form of columns or slugs interrupted at intervals by a bubble of air. The length of the glass tube 40, the diameter of the bore 42, and the capacity of the capillary tube 14 may be so proportioned that even under conditions of maximum rate of lubricant flow at least one bubble of air will be passing downwardly through the glass tube 40 at all times. When the capillary tube 14 is inclined so that the rate of flow is less, the intervals between the bubbles of air will become shorter and the bubbles will become larger. The glass tube 40 magnifies the bore 42 so that the columns or slugs of oil are easily seen.

After the operator has become accustomed to my improved rate of flow indicator, he may accurately and quickly ascertain the rate of flow of lubricant therethrough merely by glancing at the glass tubes to note the spacing of the air and oil bubbles. Also he can very quickly and easily ascertain whether or not lubricant is flowing through the tube to the machine, and there is considerably less danger of his allowing the machine to operate without lubricant than there would be if an ordinary size sight feed oiling device, requiring close inspection to see whether or not the device is supplying lubricant properly, were used.

Fig. 4 shows the transparent tubes of a plurality of my rate of flow indicators, as they appear when used in connection with a lubricating system having a plurality of separate lubricant outlets. The tubes 60, 62, 64 of my rate of flow indicators are positioned adjacent each other to afford a ready comparison of the various rates of flow therethrough. The slugs of oil 66 are shown separated by air bubbles 70. The rate of flow of lubricant through the tube 62 is greatest, as may be seen from the fact that the slug of oil therein is longest, while the rate of flow through the tube 60 is somewhat less, and the tube 64 shows the appearance of the indicator when the rate of flow of lubricant therethrough approaches its minimum value. It may thus be seen that the operator of a machine may see at a glance the relationship between the amounts of lubricant being supplied to the various bearings or other frictional surfaces thereof, and he may quickly and accurately adjust the lubricating device to give the desired rates of lubricant flow.

While I have described my invention in connection with a preferred embodiment thereof, it will be readily apparent to those skilled in the art that numerous modifications and departures may be made from the structure disclosed. It is therefore my wish to include within the scope of the following claims all modifications of my invention by which substantially the results thereof may be obtained by substantially the same or equivalent means.

I claim:

1. An indicator to show the rate of flow of a liquid comprising a receptacle for receiving and collecting the liquid and a transparent tube, having its inlet end higher than its outlet end and both of said ends subjected to the same pressure, connected to the lower end of said receptacle to drain the liquid therefrom, having a small bore diameter relative to the rate of liquid flow therethrough and having its bore diameter and length proportioned to have a liquid carrying capacity slightly larger than the normal maximum rate of liquid flow into said receptacle, whereby liquid will flow from said receptacle through said tube in short columns separated by air bubbles, and the relative amounts of air and liquid passing through said tube will indicate the rate of flow therethrough.

2. An indicator for indicating rates of liquid flow comprising a transparent tube having its inlet end positioned higher than its outlet end and having both ends communicable with the atmosphere, an oil receiving receptacle connected to the upper end of said tube, and means for supplying liquid to said receptacle at a substantially uniform rate less than the maximum rate at which liquid will flow through the bore of said tube under the gravity head between said inlet and outlet ends, whereby said liquid will entrap bubbles of air and flow downwardly through said tube, under the influence of gravity, in short columns separated by bubbles of air.

3. An indicator for liquid flow comprising a transparent tube having its inlet end positioned higher than its outlet end and having both its inlet and its outlet at atmospheric pressure, an oil receiving receptacle at the upper end of said tube and communicating with the bore thereof, and means for supplying liquid to said receptacle at an average rate less than the maximum rate at which liquid will flow through said tube under the gravity head between said inlet and outlet, whereby the liquid flowing through said tube will entrap bubbles of air and flow downwardly through said tube and the relative lengths of the air and liquid columns will indicate the flow rate of the liquid.

4. A visual indicator to show the rate of liquid flow comprising a transparent tube having a bore of capillary dimensions and having one end positioned higher than the other but both of said ends being subjected to the same pressure, and means to supply liquid to the upper end of said tube at a uniform rate less than the rate at which liquid will flow through said tube solely under the influence of gravity, whereby the liquid will flow through said tube in slugs separated by air bubbles and the rate of flow will be indicated by the relative lengths of the slugs of liquid and bubbles of air passing through the tube.

5. An indicator for showing the rate of flow of a liquid comprising a vertical glass tube having a bore of capillary dimensions, the lower end of said tube being exposed to atmospheric air, a liquid receiving and collecting receptable in communication with the upper end of the bore of said tube, means for supplying liquid to said receptacle at a predetermined adjustable rate, and means for admitting air to said receptacle, whereby liquid will flow downwardly through said tube, under the influence of gravity, in columns separated by bubbles of air.

6. An indicator for showing the rate of flow of a liquid and comprising a transparent tube having an inlet end and an outlet end and being arranged so that liquid will flow therethrough solely under the influence of gravity, means for supplying liquid to said inlet end at a rate slower than the rate of flow of liquid through said tube under the influence of gravity, said inlet end and said outlet end being exposed to atmosphere whereby liquid will flow through said tube in columns separated by bubbles of air and the relative lengths of the liquid columns and bubbles of air will indicate said rate of flow.

ERNEST W. DAVIS.